United States Patent
Yoshida

(10) Patent No.: US 8,792,108 B2
(45) Date of Patent: Jul. 29, 2014

(54) IMAGE PROCESSING APPARATUS HAVING ENHANCED DISPLAY MODE AND IMAGE PROCESSING METHOD THEREOF

(75) Inventor: Tomoyuki Yoshida, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 397 days.

(21) Appl. No.: 13/137,226

(22) Filed: Jul. 29, 2011

(65) Prior Publication Data

US 2012/0026519 A1    Feb. 2, 2012

(30) Foreign Application Priority Data

Aug. 2, 2010   (JP) ................................ 2010-173448
Jun. 29, 2011  (JP) ................................ 2011-144904

(51) Int. Cl.
G06F 3/12 (2006.01)

(52) U.S. Cl.
USPC ....... 358/1.13; 358/1.11; 358/1.18; 358/1.12; 358/3.27; 358/3.26; 358/2.1; 358/3.2; 358/1.14; 399/81; 399/52; 399/85; 399/88; 399/89; 345/505; 345/502; 345/204; 345/530

(58) Field of Classification Search
CPC .................................................. G09G 2360/08
See application file for complete search history.

(56) References Cited

U.S. PATENT DOCUMENTS

| | | | |
|---|---|---|---|
| 7,339,700 B2 * | 3/2008 | Ohga et al. ................ | 358/1.9 |
| 7,376,268 B2 | 5/2008 | Shirata et al. | |
| 7,414,750 B2 | 8/2008 | Yoshida | |
| 7,664,320 B2 | 2/2010 | Yoshida et al. | |
| 7,692,816 B2 | 4/2010 | Kawamoto et al. | |
| 7,698,471 B2 | 4/2010 | Aoki et al. | |
| 7,940,984 B2 | 5/2011 | Ohkawa et al. | |
| 8,259,373 B2 | 9/2012 | Jung | |
| 2002/0122209 A1 | 9/2002 | Yoshida | |
| 2003/0053097 A1 * | 3/2003 | Ohga et al. ................ | 358/1.9 |
| 2004/0114172 A1 | 6/2004 | Ohyama et al. | |
| 2004/0125410 A1 | 7/2004 | Shirata et al. | |
| 2004/0131263 A1 | 7/2004 | Kawamoto et al. | |
| 2004/0156076 A1 | 8/2004 | Togami et al. | |

(Continued)

FOREIGN PATENT DOCUMENTS

| | | |
|---|---|---|
| CN | 1497425 | 5/2004 |
| CN | 1802842 | 7/2006 |

(Continued)

OTHER PUBLICATIONS

Abstract of JP 2006-041947 published Feb. 9, 2006.

(Continued)

*Primary Examiner* — Hilina K Demeter
(74) *Attorney, Agent, or Firm* — Harness, Dickey & Pierce, P.L.C.

(57) ABSTRACT

An image processing apparatus includes an image-processing designating unit that allows a user to designate predetermined image processing to be applied to image data for generating a preview image that represents a state of an output image before image output; a preview-image generating unit that generates a preview image in accordance with the designated image processing; a preview-image display unit that displays the preview image generated by the preview-image generating unit; and a display-mode switching control unit that, when the preview image is displayed, switches to a display mode with an enhanced viewability relative to a power-saving display state in accordance with a content of the designated image processing.

16 Claims, 16 Drawing Sheets

(56) References Cited

U.S. PATENT DOCUMENTS

| | | |
|---|---|---|
| 2004/0252286 A1 | 12/2004 | Murray et al. |
| 2005/0213120 A1 | 9/2005 | Ohkawa et al. |
| 2007/0030504 A1 | 2/2007 | Kawamoto et al. |
| 2007/0053009 A1 | 3/2007 | Ito et al. |
| 2007/0058224 A1 | 3/2007 | Kawamoto et al. |
| 2007/0064267 A1 | 3/2007 | Murakata et al. |
| 2007/0070405 A1 | 3/2007 | Murakata et al. |
| 2007/0070438 A1 | 3/2007 | Yoshida et al. |
| 2007/0086068 A1 | 4/2007 | Ohkawa et al. |
| 2007/0226692 A1 | 9/2007 | Nozawa et al. |
| 2008/0006871 A1 | 1/2008 | Liao |
| 2008/0008388 A1 | 1/2008 | Ohkawa et al. |
| 2008/0018920 A1* | 1/2008 | Kawamoto et al. ............. 358/1.9 |
| 2008/0030523 A1* | 2/2008 | Takami et al. ................. 345/619 |
| 2008/0037036 A1 | 2/2008 | Togami et al. |
| 2008/0043291 A1 | 2/2008 | Togami et al. |
| 2008/0056615 A1 | 3/2008 | Kuno |
| 2008/0094669 A1 | 4/2008 | Imai |
| 2009/0237686 A1 | 9/2009 | Yoshida et al. |
| 2009/0237714 A1 | 9/2009 | Fukuda et al. |
| 2010/0027055 A1 | 2/2010 | Mori |
| 2010/0053133 A1* | 3/2010 | Furuta ............................ 345/207 |
| 2011/0249282 A1* | 10/2011 | Takami et al. .................. 358/1.9 |
| 2012/0050788 A1* | 3/2012 | Bachman et al. ............. 358/1.15 |

FOREIGN PATENT DOCUMENTS

| | | |
|---|---|---|
| CN | 1928805 | 3/2007 |
| CN | 101136978 | 3/2008 |
| CN | 101640744 | 2/2010 |
| JP | 2006041947 A | 2/2006 |
| JP | 2007166515 A | 6/2007 |

OTHER PUBLICATIONS

Abstract of JP 2007-166515 published Jun. 28, 2007.
Chinese Office Action and English language translation thereof dated Jul. 25, 2013.

* cited by examiner

FIG.10

| MANGEMENT CODE DATA || |
|---|---|---|
| [1] | APPLICATION TYPE | COPY |
| [2] | COLOR MODE | BLACK-AND-WHITE |
| [3] | IMAGE QUALITY MODE | CHARACTER |
| [4] | IMAGE QUALITY ADJUSTMENT | DEFAULT |
| [5] | EDITING | NOT SET |
| [6] | POST-PROCESSING | NOT SET |

| IMAGE QUALITY ADJUSTMENT |
|---|
| EDITING, POST-PROCESSING |
| COLOR MODE PROCESS |
| ENLARGEMENT/REDUCTION, MOVEMENT |
| ⋮ |

FIG.13

BEFORE 502

| MANGEMENT CODE DATA | | |
|---|---|---|
| [1] | APPLICATION TYPE | COPY |
| [2] | COLOR MODE | BLACK-AND-WHITE |
| [3] | IMAGE QUALITY MODE | CHARACTER |
| [4] | IMAGE QUALITY ADJUSTMENT | DEFAULT |
| [5] | EDITING | NOT SET |
| [6] | POST-PROCESSING | NOT SET |

FIG.14

AFTER 503

| MANAGEMENT CODE DATA | | |
|---|---|---|
| [1] | APPLICATION TYPE | COPY |
| [2] | COLOR MODE | BLACK-AND-WHITE |
| [3] | IMAGE QUALITY MODE | CHARACTER |
| [4] | IMAGE QUALITY ADJUSTMENT | DEFAULT |
| [5] | EDITING | NOT SET |
| [6] | POST-PROCESSING | SET |

702
PREVIEW WHEN IMAGE QUALITY
ADJUSTMENT IS SET
(DISPLAY WITH INCREASED
BRIGHTNESS)

BEFORE 504

| | MANAGEMENT CODE DATA | |
|---|---|---|
| [1] | APPLICATION TYPE | COPY |
| [2] | COLOR MODE | COLOR |
| [3] | IMAGE QUALITY MODE | CHARACTER |
| [4] | IMAGE QUALITY ADJUSTMENT | DEFAULT |
| [5] | EDITING | NOT SET |
| [6] | POST-PROCESSING | NOT SET |

| AFTER | | 505 |
|---|---|---|
| MANAGEMENT CODE DATA | | |
| [1] | APPLICATION TYPE | COPY |
| [2] | COLOR MODE | COLOR |
| [3] | IMAGE QUALITY MODE | CHARACTER |
| [4] | IMAGE QUALITY ADJUSTMENT | ADJUSTMENT SET |
| [5] | EDITING | NOT SET |
| [6] | POST-PROCESSING | NOT SET |

FIG.19

BEFORE 506

| MANGEMENT CODE DATA | | |
|---|---|---|
| [1] | APPLICATION TYPE | COPY |
| [2] | COLOR MODE | BLACK-AND-WHITE |
| [3] | IMAGE QUALITY MODE | CHARACTER |
| [4] | IMAGE QUALITY ADJUSTMENT | DEFAULT |
| [5] | EDITING | NOT SET |
| [6] | POST-PROCESSING | NOT SET |

FIG.20

AFTER 507

| MANAGEMENT CODE DATA | | |
|---|---|---|
| [1] | APPLICATION TYPE | COPY |
| [2] | COLOR MODE | BLACK-AND-WHITE |
| [3] | IMAGE QUALITY MODE | CHARACTER |
| [4] | IMAGE QUALITY ADJUSTMENT | DEFAULT |
| [5] | EDITING | SET |
| [6] | POST-PROCESSING | SET |

IMAGE PROCESSING APPARATUS HAVING ENHANCED DISPLAY MODE AND IMAGE PROCESSING METHOD THEREOF

CROSS-REFERENCE TO RELATED APPLICATIONS

The present application claims priority to and incorporates by reference the entire contents of Japanese Patent Application No. 2010-173448 filed in Japan on Aug. 2, 2010 and Japanese Patent Application No. 2011-144904 filed in Japan on Jun. 29, 2011.

BACKGROUND OF THE INVENTION

1. Field of the Invention

The present invention relates to an image processing apparatus and an image processing method.

2. Description of the Related Art

A multi function printer (MFP) has a preview function that allows advance checking of an image, which is an output result, by displaying the image on the screen of an operation display unit when the image is output from the MFP. For example, a user checks, in advance, image quality (density, sharpness, color shade, and the like), editing (binding margin, combination printing, and the like), and post-processing (stapling position, punching position, and the like).

In an MFP with low power consumption, its mode is changed to a sleep mode while the MFP is in the stand-by state when the MFP is not being used by a user so as to turn off and stop an operation display unit, which is one of the units that uses a lot of electricity; thus, the power consumption is reduced. If an instruction (pressing of a copy button, a print command from a network, or the like) is received from a user, the MFP is turned on and returned from the stand-by state, so the sleep mode is changed to the normal operating mode.

With respect to the operation display unit whose power consumption is to be reduced, if a display method (the brightness, or the like) is switched even during the normal operation, the power consumption can be reduced. However, the reduction in the power consumption makes it difficult to ensure the viewability of a display unit; therefore, a user uniformly adjusts (adjust the brightness of) the entire operation display unit on a case-by-case basis according to the usage environment. For this reason, there is a problem in that the power consumption cannot be effectively reduced by switching a display method, such as the brightness, during the normal operation while maintaining the viewability for a user.

For example, in Japanese Patent Application Laid-open No. 2007-166515, an image display unit includes a two-level brightness control unit whereby, during the normal operation, the image display unit is operated in a low power-consumption mode with low brightness and, if a shutter button is pressed halfway during a shooting-preparation operation, the image display unit is operated with higher brightness than normal brightness. Thus, a reduction in power consumption and an improvement in battery duration are achieved while desired viewability during shooting is ensured.

In the conventional MFP that is described above, because various details and conditions are to be checked in image previewing, the viewability needs to be maintained according to the checked details while the power consumption is effectively reduced. For example, there is a problem in that, because securing a reduction in power consumption has a high priority, the viewability is not sufficiently maintained and, as a result, there is a possibility of an erroneous copy operation.

SUMMARY OF THE INVENTION

It is an object of the present invention to at least partially solve the problems in the conventional technology.

According to an aspect of the present invention, there is provided an image processing apparatus that includes an image-processing designating unit that allows a user to designate predetermined image processing to be applied to image data for generating a preview image that represents a state of an output image before image output; a preview-image generating unit that generates a preview image in accordance with the designated image processing; a preview-image display unit that displays the preview image generated by the preview-image generating unit; and a display-mode switching control unit that, when the preview image is displayed, switches to a display mode with an enhanced viewability relative to a power-saving display state in accordance with a content of the designated image processing.

According to another aspect of the present invention, there is provided an image processing apparatus that includes an image-processing designating unit that allows a user to designate first and second image processing, which differ in setting detail, to be applied to image data for generating preview images that represent different states of an output image before image output; a preview-image generating unit that generates first and second preview images in accordance with the first and second image processing, respectively; a preview-image display unit that displays, side-by-side, the first and second preview images having been subjected to the first and second image processing, respectively; and a display-mode switching control unit that, when the first and second preview images are displayed side-by-side, switches a display mode with an enhanced viewability relative to a power-saving display state in accordance with a difference in setting detail between the first and second image processing.

According to still another aspect of the present invention, there is provided an image processing method that includes allowing a user to designate predetermined image processing to be applied to image data for generating a preview image that represents a state of an output image before image output; generating a preview image in accordance with the designated image processing; displaying the preview image generated at the generating; and switching, when the preview image is displayed, to a display mode, with an enhanced viewability relative to a power-saving display state in accordance with a content of the designated image process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 shows a table that illustrates an example of management code data that is generated by a management unit and is stored in a management code-data storage unit;

FIG. 11 shows a table that illustrates an example of data registered in a registration unit;

FIG. 13 shows a table that illustrates management code data on the before-designation preview image data illustrated in FIG. 12;

FIG. 14 show a table that illustrates management code data on the after-designation preview image data illustrated in FIG. 12;

FIG. 19 shows a table that illustrates management code data on the before-designation preview image data illustrated in FIG. 18;

FIG. 20 shows a table that illustrates management code data on the after-designation preview image data illustrated in FIG. 18;

DETAILED DESCRIPTION OF THE PREFERRED EMBODIMENTS

Exemplary embodiments of the present invention are explained in detail below with reference to the accompanying drawings. According to the present invention, when a preview image is displayed on a display device so that an image output from an MFP can be checked in advance, a display method (brightness, or the like) of the display device is switched in accordance with the content of processing that the user wants to check with a preview, i.e., image quality adjustment (density, sharpness, color shade, and the like), editorial processing (binding margin, combination printing, and the like), and post-processing (stapling position, punching position, and the like); thus, power consumption is reduced without impairing the viewability and legibility for a user. Hereafter, an explanation is given, in each embodiment, of configurations and operations that embody the present invention.

First Embodiment

Figure 1:
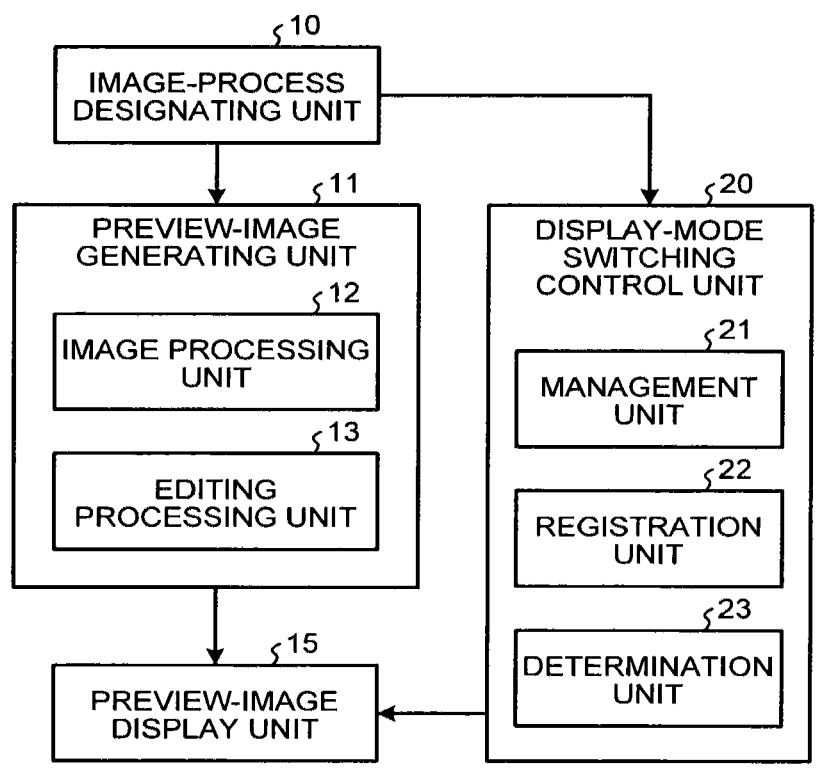
FIG. 1 is a block diagram that illustrates the functional configuration of an image processing apparatus according to the present embodiment.

FIG. 1 is a block diagram that illustrates the functional configuration of an image processing apparatus according to the present embodiment. As illustrated in FIG. 1, the image processing apparatus principally includes an image-processing designating unit 10, a preview-image generating unit 11, a preview-image display unit 15, and a display-mode switching control unit 20. The image-processing designating unit 10 includes an operation unit 114 that allows a user to designate predetermined image processing to be applied to image data of a document. The preview-image generating unit 11 generates a preview image in accordance with the designated image processing designated through the image-process designating unit 10. The preview-image display unit 15 displays the preview image of image data that have been subjected to the designated image processing by the preview-image generating unit 11. When the preview image is displayed, the display-mode switching control unit 20 switches the power-saving display mode to the viewability-enhancing display mode in accordance with the content of the designated image processing.

The preview-image generating unit 11 includes an image processing unit 12 and an editing processing unit 13. The display-mode switching control unit 20 includes a management unit 21, a registration unit 22, and a determination unit 23. The display-mode switching control unit 20 also has a function such that, when first and second different preview images are displayed side-by-side, it switches the power-saving display mode to the viewability-enhancing display mode in accordance with a difference in setting detail between first and second image processing, which differ in setting detail.

The management unit 21 manages information of the designated image processing and setting detail thereof. The registration unit 22 registers therein a list of image processing determined to be checked in the viewability-enhancing display mode when displaying a preview image subjected to the image processing. The determination unit 23 determines whether or not the designated image processing matches any of the image processing in the list registered in the registration unit 22.

The management unit 21 manages information of first and second designated image processing and setting details thereof. The determination unit 23 compares the setting detail of the first image processing with the setting detail of the second image processing so as to extract a difference therebetween, and then determines whether or not the difference corresponds to a setting detail of the image processing that is listed in the list registered in the registration unit 22. Hereafter, an explanation is given of an image forming apparatus that includes the above functional blocks and of relevant configurations and operations.

Figure 2:
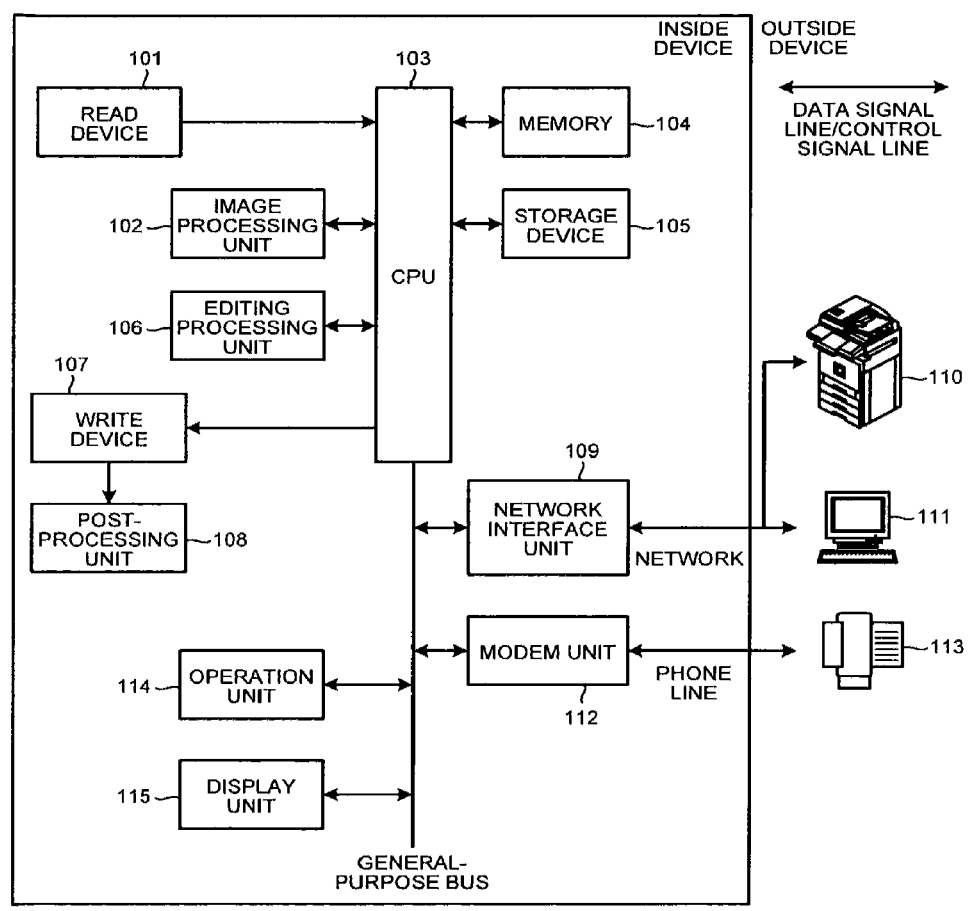
FIG. 2 is a block diagram that illustrates the overall configuration of an image forming apparatus (MFP) according to the present embodiment.

FIG. 2 is a block diagram that illustrates the overall configuration of an image forming apparatus (MFP) according to the present embodiment. As illustrated in FIG. 2, the MFP includes a read device 101, a write device 107, a CPU 103, a memory 104, an image processing unit 102, an editing processing unit 106, a network interface unit 109, a modem unit 112, an operation unit 114, a display unit 115, and a post-processing unit 108.

The read device 101 reads a document so as to obtain electronic image data. The write device 107 prints out the image data on a transfer sheet. The CPU 103 controls each unit included in the MFP. The memory 104 receives image data via the CPU 103 and a bus and temporarily stores therein the image data. A storage device 105 stores therein image data and various types of bibliographic information. The image processing unit 102 performs image processing on image data stored in the memory 104 or the storage device 105. The editing processing unit 106 performs editing processing. The network interface unit 109 transmits and receives image data to and from an external device, such as a different MFP 110 or a personal computer (PC) 111, via a network. The modem unit 112 transmits and receives image data to and from an external device, such as a facsimile apparatus (FAX) 113, via a phone line. Various keys, and the like, are arranged on the operation unit 114 so that a user can perform a predetermined input operation. The display unit 115 displays a preview image of image data and setting information that is set through the operation unit 114. The post-processing unit 108 performs post-processing, such as punching or stapling, on a transfer sheet that is printed out by the write device 107.

Figure 3:
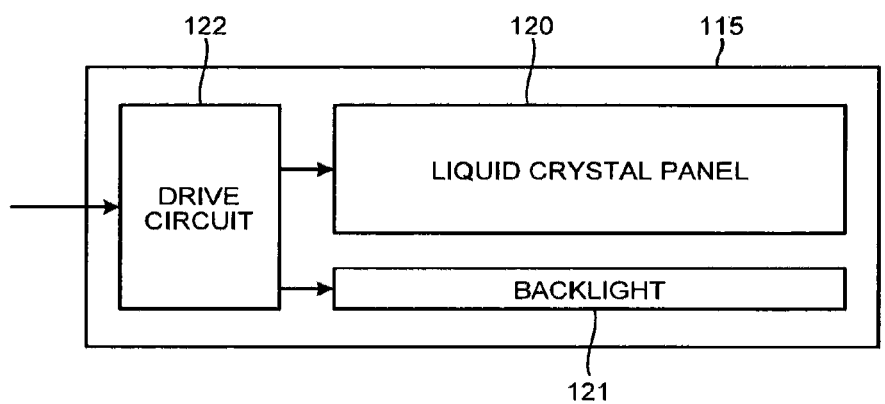
FIG. 3 is a block diagram that illustrates the configuration of a display unit illustrated in FIG. 2.

FIG. 3 is a block diagram that illustrates the configuration of the display unit 115 illustrated in FIG. 2. A liquid crystal display module is used as the display unit 115. The liquid crystal display module includes a liquid crystal panel 120 that displays data; a backlight 121 that illuminates the liquid crystal panel 120 from the back; and a drive circuit 122. The CPU 103 causes, via the drive circuit 122, the liquid crystal panel 120 to display image data and setting information and can control and adjust the contrast and the brightness.

In this example, for instance, a generally-used 8.4-inch color TFT liquid crystal display with an LED backlight is used as the display unit 115. As for the power consumption of the display unit 115, more power is consumed by the backlight 121 than is consumed by driving the liquid crystal panel 120. The ratio between the maximum brightness and the minimum brightness of the liquid crystal display, i.e., the contrast ratio, is changed by adjusting the backlight 121. If the brightness of the backlight 121 is decreased, the power consumption is reduced; however, the contrast ratio is decreased, which results in not only unclear black-and-white presentation but also a decrease in color purity of colored presentation. If the brightness of the backlight is increased, the power consumption is increased; however, the contrast ratio is increased, which results in clear black-and-white presentation, an increase in color purity of colored presentation, and an enhancement of viewability. Furthermore, the backlight 121 can adjust the brightness of an arbitrary area of the liquid crystal panel 120 via the drive circuit 122.

Figure 4:
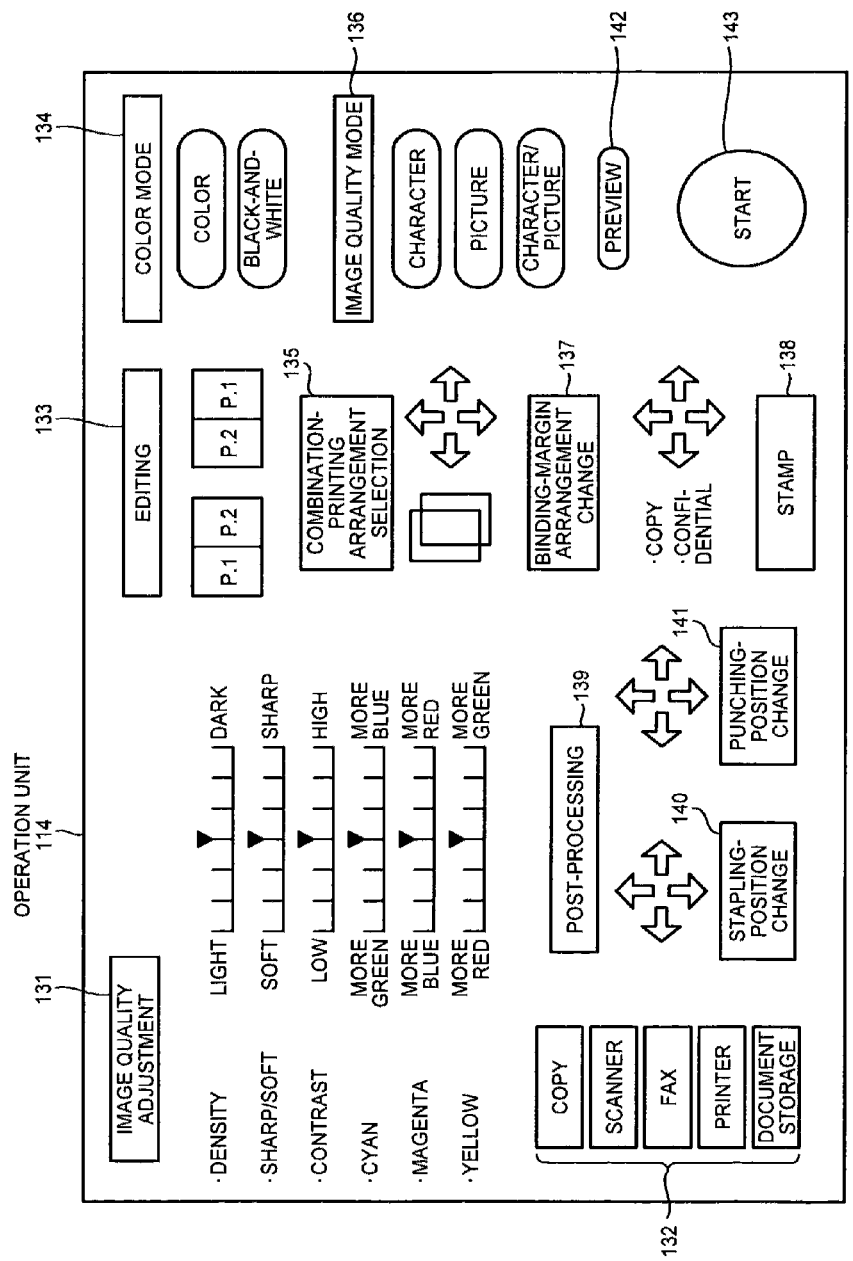
FIG. 4 is an explanatory diagram that illustrates the configuration of an operation unit illustrated in FIG. 2.

FIG. 4 is an explanatory diagram that illustrates the configuration of the operation unit 114 illustrated in FIG. 2. The operation unit 114 includes various keys (buttons) through which a user can make an input. As illustrated in FIG. 4, the operation unit 114 includes an image-quality adjustment key 131, a function selection key 132, an editing setting key 133, a color-mode selection key 134, a combination-printing arrangement selection key 135, an image-quality mode key 136, a binding-margin arrangement change key 137, a stamp addition key 138, a post-processing setting key 139, a staple-position change key 140, a punch-position change key 141, a preview key 142, and a start key 143.

A user manipulates the function selection key 132 with respect to a designation item (copy/scanner/fax, and the like) for an application so as to select a function (an operation application) of the MFP. In the same manner, the user manipulates a designation item for a color mode by using the color-mode selection key 134 so as to select a color mode for an application, such as color copy or black-and-white copy. Furthermore, the user manipulates a designation item for an image quality mode by using the image-quality mode key 136 so as to select a mode for finished image quality to be output. The user manipulates a designation item for image quality adjustment by using the image-quality adjustment key 131 so as to adjust, with respect to an output image, the finished image, such as density, sharpness/softness, or contrast, and color shade, such as adding more green to cyan. Moreover, the user manipulates a designation item for editing by using the editing setting key 133 so as to designate editing processing with respect to an output image. For example, the user can designate editing processing, such as a combination printing setting by manipulating the combination-printing arrangement selection key 135 or adding a binding margin by using the binding-margin arrangement change key 137. The user manipulates a designation item for post-processing by using the post-processing setting key 139 so as to designate post-processing, such as stapling, punching, or stamping, with respect to a sheet that is output after images are formed thereon.

Figure 5:
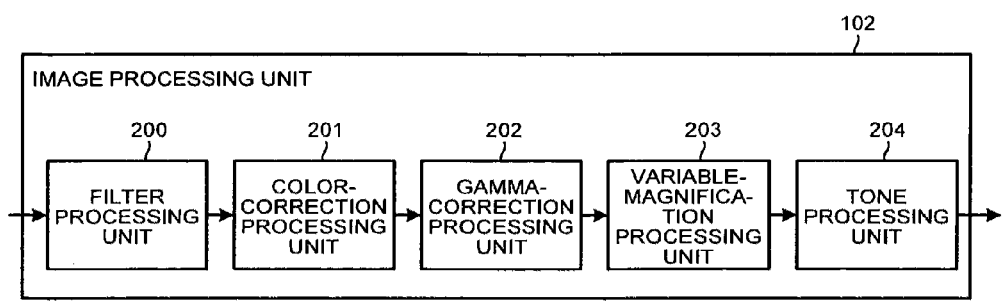
FIG. 5 is a block diagram that illustrates the configuration of an image processing unit illustrated in FIG. 2.

FIG. 5 is a block diagram that illustrates the configuration of the image processing unit 102 illustrated in FIG. 2. A filter processing unit 200 performs a correction process on a spatial frequency with respect to image data in accordance with a user's designation. For example, a sharpening process is performed in accordance with a designation for a clear-character image-quality mode in a character mode or in accordance with a designation for sharpening as illustrated in FIG. 4. A smoothing process is performed in accordance with a designation for a smooth image-quality mode in a picture mode or in accordance with a designation for softening as illustrated in FIG. 4.

A color-correction processing unit 201 performs a correction process with respect to colors in accordance with a user's designation. For example, if a color image is output to the write device 107, RGB (R: red, G: green, B: blue) data received from the read device 101 is converted into CMYK (C: cyan, M: magenta, Y: yellow, K: black) image data. If an image is output to the PC 111, device RGB is converted into standard RGB (sRGB). Furthermore, in accordance with a designation with respect to the color shade illustrated in FIG. 4, color tone is adjusted in color conversion from RGB to CMYK or in color conversion from device RGB to standard RGB.

A gamma-correction processing unit 202 adjusts the brightness of an output image in accordance with a designation for the density or contrast illustrated in FIG. 4. A variable-magnification processing unit 203 performs a process for converting a pixel density in accordance with a user's designation (a designation for enlargement or reduction, or resolution). A tone processing unit 204 performs a process for converting the number of tones in accordance with a user's designation and an output destination. For example, if a designation is given for copy output in a character mode, a tone conversion process is performed with superiority in resolution by using an error diffusion method and, if a designation is given for copy output in a picture mode, a tone conversion process is performed with superiority in smoothness by dithering.

Figure 6:
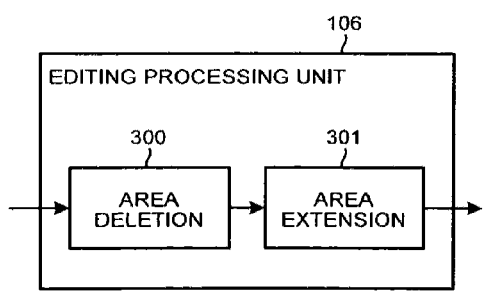
FIG. 6 is a block diagram that illustrates the configuration of an editing processing unit illustrated in FIG. 2.

FIG. 6 is a block diagram that illustrates the configuration of the editing processing unit 106 illustrated in FIG. 2. An area deleting unit 300 deletes an arbitrary area of image data in the directions of the four sides of the image data. An area extending unit 301 extends an arbitrary area of image data in the directions of the four sides of the image data. Specifically, image data can be shifted from right to left or up and down. The editing processing unit 106 performs an operation if a user specifies a setting for the addition of a binding margin as illustrated in FIG. 4.

Figure 7:
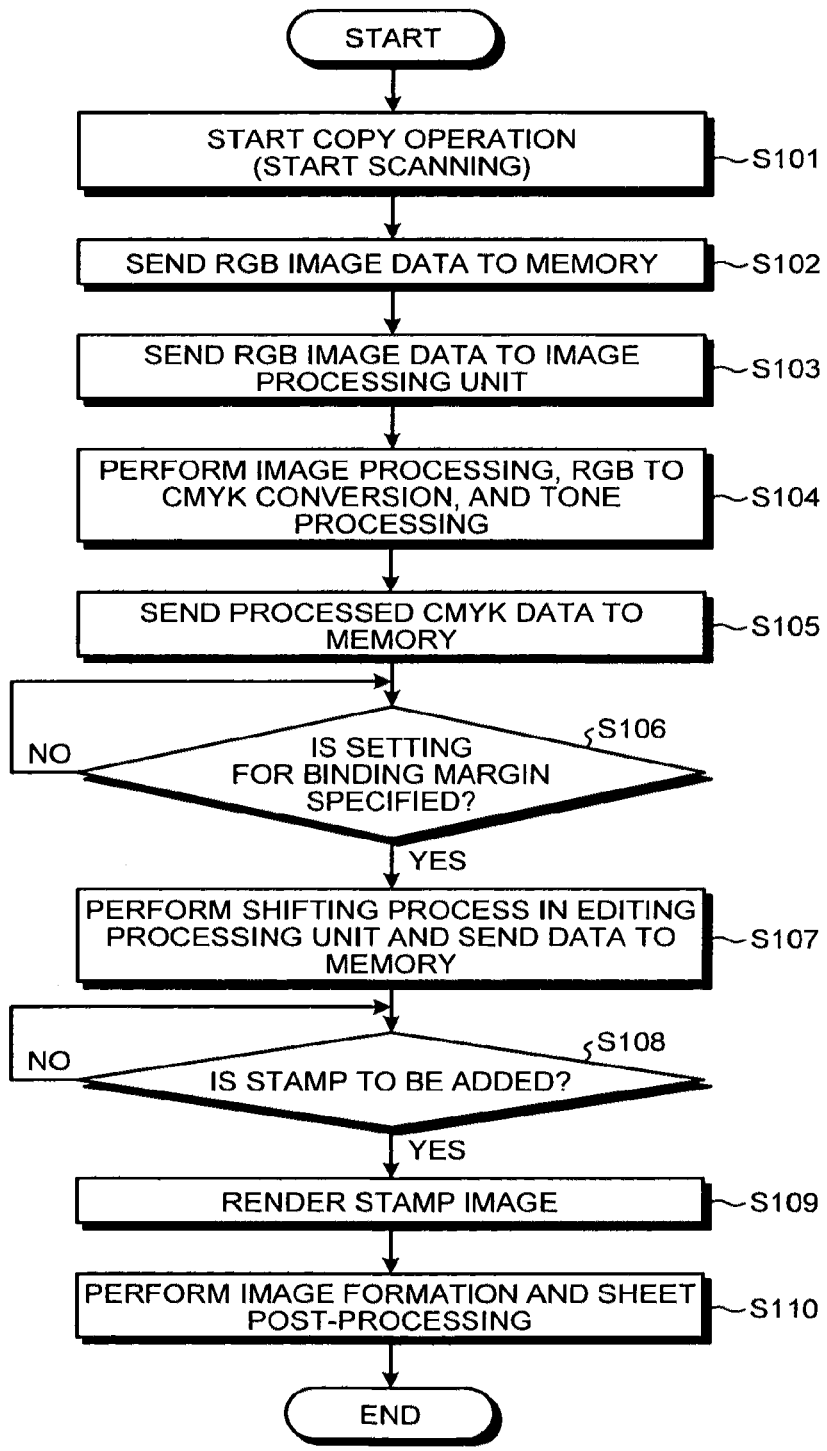
FIG. 7 is a flowchart that illustrates a copy operation performed by the MFP according to the present embodiment.

Next, an explanation is given of a copy operation performed by the MFP that is configured as described above. FIG. 7 is a flowchart that illustrates the copy operation performed by the MFP according to this embodiment. The CPU 103 illustrated in FIG. 2 executes the overall operation. As illustrated in FIG. 7, first, a user, selects the copy function (application) on the operation unit 114 illustrated in FIG. 4 and presses the start button 143. When this operation is received, the read device 101 scans a document so as to read the document (Step S101). Then, RBG image data corresponding to an image of the document scanned and read by the read device 101 is sent to the memory 104 (Step S102). The RGB image data is then sent to the image processing unit 102 (Step S103) so that image processing is performed in accordance with various settings, as illustrated in FIG. 4, and image processing is performed in conformity with the write device 107 (Step S104). For color copy, the image data is subjected to RGB to CMYK conversion and tone processing so as to conform to the electrophotographic process of the write device 107 that uses CMYK toners and is then sent to the memory 104 again (Step S105).

Next, it is determined whether the setting for the addition of a binding margin has been specified through the operation unit 114 illustrated in FIG. 4 (Step S106). If the setting for the addition of a binding margin has been made (Yes), the CMYK image data is sent to the editing processing unit 106 so that the image is shifted corresponding to the added binding margin. Then, the image data is sent to the memory 104 again (Step S107).

Next, it is determined whether the setting for the addition of a stamp has been specified through the operation unit 114 illustrated in FIG. 4 (Step S108). If the setting for the addition of a stamp has been made, the CPU 103 renders a stamp image on the CMYK image data stored in the memory 104 (Step S109).

The CMYK image data in the memory 104 is then sent to the write device 107. The write device 107 forms and outputs an image on a transfer sheet by using an electrophotographic process. The transfer sheet is sent to the post-processing unit 108 so that post-processing, such as stapling or punching, is performed in accordance with a designation illustrated in FIG. 4 (Step S110).

In the same manner, RGB data on the document scanned by the read device 101 is converted into standard RGB (sRBG) by the image processing unit 102 and the data is then output via the network interface unit 109 so that an electronic document is transmitted. Thus, the operation of the scanner function is performed.

Figure 8:
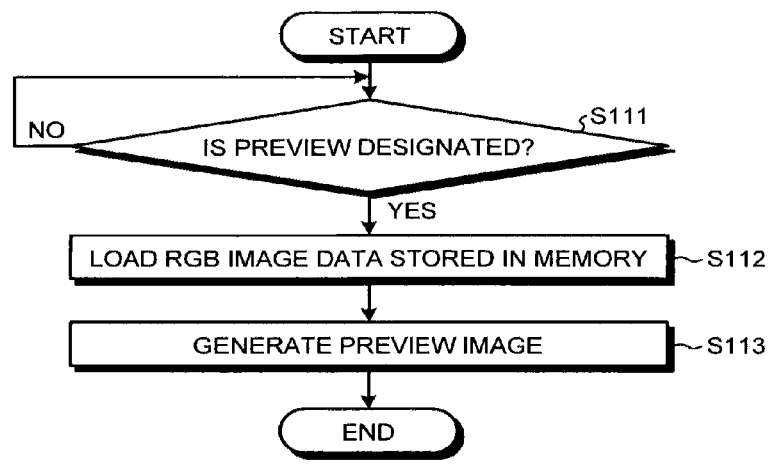
FIG. 8 is a flowchart that illustrates an operation for generating a preview image according to the present embodiment.

An explanation is given of an operation for checking a preview image in the copy operation performed by the MFP. FIG. 8 is a flowchart that illustrates an operation for generating a preview image according to this embodiment. First, it is determined whether the preview key 142 on the operation unit 114 illustrated in FIG. 4 has been pressed so as to designate a preview (Step S111). If a preview has been designated (Yes), RGB image data, which is sent from the read device 101 and stored in the memory 104, is loaded (Step S112). The image processing unit 102 generates a preview image by using the loaded image data (Step S113). At that time, the image processing unit 102 performs, on the preview image, image processing, such as image quality adjustment, resolution conversion, addition of a binding margin, addition of a stamp, or generation of a quasi-image for sheet post-processing, that is designated through the operation unit 114.

The RGB image data is sent from the memory 104 to the image processing unit 102 so as to be subjected to a process for image quality adjustment that has been designated through the operation unit 114 illustrated in FIG. 4, and RGB image data for which the pixel density has been converted for preview is again sent to the memory 104. In this example, an image with the reading density of 600 dots per inch (dpi) is converted into a preview image of 150 dpi.

If the setting for the addition of a binding margin has been made through the operation unit 114 illustrated in FIG. 4, the RGB image data is sent to the editing processing unit 106 so as to be subjected to a shifting process and is then sent to the memory 104 again.

If the setting for the addition of a stamp has been made through the operation unit 114 illustrated in FIG. 4, the CPU 103 renders a stamp image in the RGB image data stored in the memory 104. If stapling or punching has been designated through the operation unit 114 illustrated in FIG. 4, the CPU 103 renders a quasi-image in the RGB image data stored in the memory 104 so that the processing position for stapling or punching can be determined.

By the above-described process, RGB preview image data is generated in the memory 104. The CPU 103 stores, in the memory 104 together with the generated preview image data, code data that manages various types of information designated through the operation unit 114 with respect to the preview image data.

Figure 9:
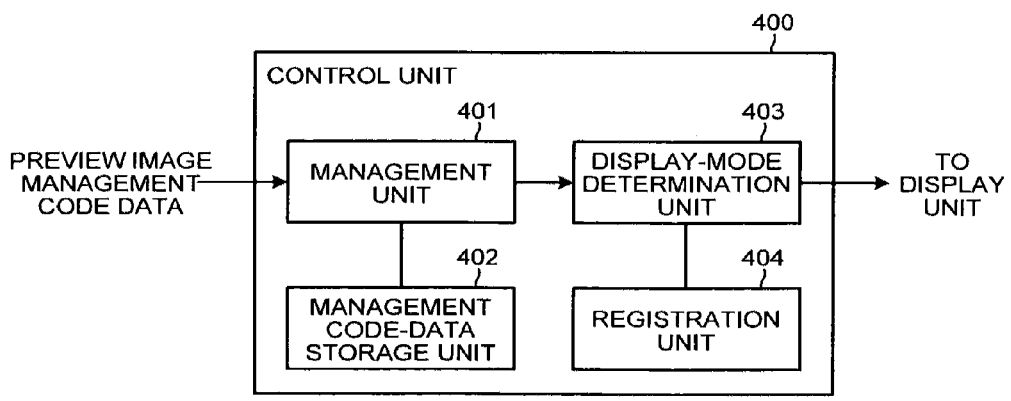
FIG. 9 is a block diagram that illustrates a configuration example of a control unit that controls a display mode according to the present embodiment.

FIG. 9 is a block diagram that illustrates the configuration example of a control unit 400 that controls a display mode according to this embodiment. As illustrated in FIG. 9, the reference numeral 400 denotes the control unit, the reference numeral 401 a management unit, the reference numeral 402 a management code-data storage unit, the reference numeral 403 a display-mode determination unit, and the reference numeral 404 a registration unit. The management unit 401 and the display-mode determination unit 403 are processing units executed by the CPU 103. The management code-data storage unit 402 and the registration unit 404 are storage regions that are set in the memory 104 or the storage device 105.

FIG. 10 shows a table that illustrates an example of management code data that is generated by the management unit 401 and is stored in the management code-data storage unit 402. Management code data 501 illustrated in FIG. 10 indicates that designations have been made through the operation unit 114 illustrated in FIG. 4 such that the application is the copy function, the color mode is black-and-white, the image quality mode is a character, the image quality adjustment is a default (a standard setting), and the editing and post-processing are not set.

FIG. 11 shows a table that illustrates an example of data registered in the registration unit 404. Registered in the registration unit 404 is a list of the image processing (registration data 601) determined to be checked in the viewability-enhancing display mode when displaying a preview image subjected to the image processing. For example, the image quality adjustment is determined to be checked in the viewability-enhancing display mode such that the brightness of the display unit 115 is increased. When the image processing designated through the operation unit 114 are not listed in the list registered in the registration unit 404, a preview image subjected to the designated image processing is displayed in the power-saving mode with normal brightness. The list of the image processing registered in the registration unit 404 can be rewritten according to a designation performed through the operation unit 114.

The display-mode determination unit 403 refers to the registration unit 404 by using the management code data 501 that is sent together with preview image data and, if the image processing of the management code data 501 matches any of the image processing of registration data 601, determines that the display mode is the viewability-enhancing mode. Then, the preview image data is sent to the display unit 115 so as to be displayed as a preview image. At that time, in accordance with the viewability-enhancing mode, the drive circuit 122 illustrated in FIG. 3 is controlled so that the brightness or contrast in displaying a preview image is increased.

If the image processing of the management code data 501 does not match any of image processing of the registration data 601, the preview image is displayed in the power-saving mode that produces the normal state with reduced brightness.

According to the content of the image processing that a user wants to check using a preview image, the brightness of the display unit 115 is increased only when the user requires viewability in displaying a preview image. This allows an improvement in viewability for the user, the prevention of false recognition in image previewing, and the prevention of erroneous copies; therefore, it is possible to significantly improve running costs for a user. Furthermore, the display brightness in the normal state can be decreased, and thus the power consumption can be reduced.

Next, an explanation is given by using a specific example of a preview image. By using RGB image data that is sent from the read device 101 and stored in the memory 104, generation of a preview image is repeated twice so that two preview images, i.e., the image obtained before a designation is made and the image obtained after a designation is made by using the operation unit 114 illustrated in FIG. 4, can be arranged side-by-side for checking.

Figure 12:
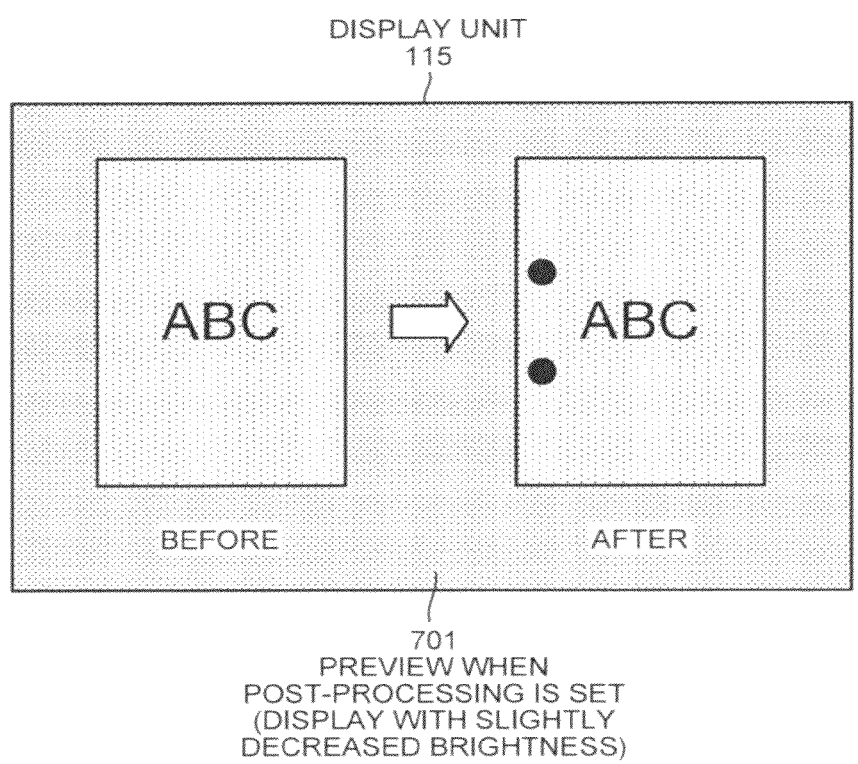
FIG. 12 is an explanatory diagram that illustrates a preview example of a before-designation preview image and an after-designation preview image.

FIG. 12 is an explanatory diagram that illustrates a preview example 701 of a before-designation preview image and an after-designation preview image. FIG. 13 shows a table that illustrates management code data 502 on the before-designation preview image data illustrated in FIG. 12, and FIG. 14 shows a table that illustrates management code data 503 on the after-designation preview image data illustrated in FIG. 12.

The display-mode determination unit 403 compares the management code data 502 on the before-designation preview image data with the management code data 503 on the after-designation preview image data and, as a result of the comparison, determines that the difference therebetween is only setting of the post-processing. Here, in the management code data 503, the post-processing has been set in order to, for example, check the punching position (in order to determine whether the punching position is not overlapped with an image).

The display-mode determination unit 403 checks whether or not the post-processing is listed in the list of image processing registered in the registration unit 404 and, because the post-processing is not listed in this example, displays a preview image with normal brightness (the power-saving mode).

Figures 15, 16:
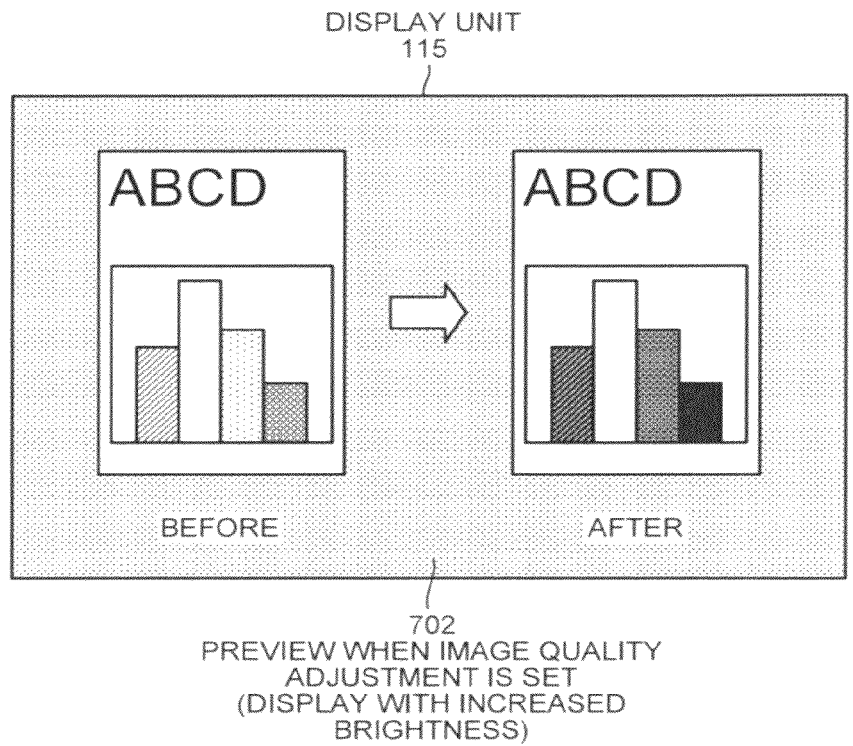
FIG. 15 is an explanatory diagram that illustrates a preview example of a before-designation preview image and an after-designation preview image.
FIG. 16 shows a table that illustrates management code data on the before-designation preview image data illustrated in FIG. 15.

FIG. 15 is an explanatory diagram that illustrates a preview example 702 of a before-designation preview image and an after-designation preview image. FIG. 16 shows a table that illustrates management code data 504 on the before-designation preview image data illustrated in FIG. 15, and FIG. 17 shows a table that illustrates management code data 505 on the after-designation preview image data illustrated in FIG. 15.

The display-mode determination unit 403 compares the management code data 504 on the before-designation preview image data with the management code data 505 on the after-designation preview image data and, as a result of the comparison, determines that the difference therebetween is setting of the image quality adjustment.

The display-mode determination unit 403 checks whether or not the image quality adjustment is listed in the list of image processing registered in the registration unit 404 and, because the image quality adjustment is listed in this example, instructs the display unit 115 to enter the viewability-enhancing mode; thus, a preview image is displayed with increased brightness in the viewability-enhancing mode, which results in clear black-and-white presentation and an increase in color purity of colored presentation. Hence, the viewability for the user can be improved, and false recognition in image previewing can be avoided. After preview checking is finished, normal brightness is set again.

Figures 17, 18:
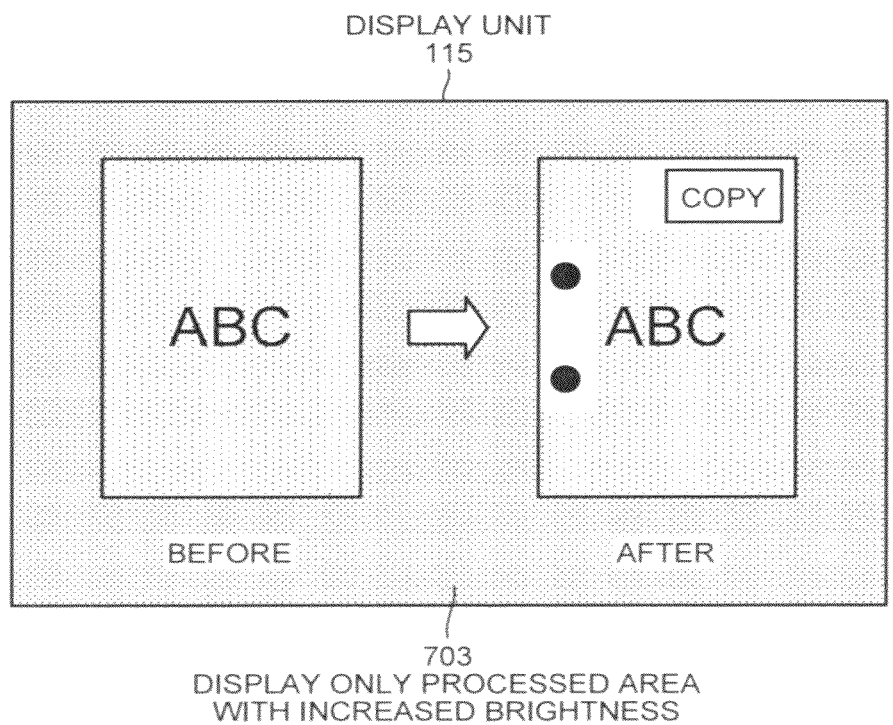
FIG. 17 show a table that illustrates management code data on the after-designation preview image data illustrated in FIG. 15.
FIG. 18 is an explanatory diagram that illustrates a preview example of a before-designation preview image and an after-designation preview image.

FIG. 18 is an explanatory diagram that illustrates a preview example 703 of a before-designation preview image and an after-designation preview image. FIG. 19 shows a table that illustrates management code data 506 on the before-designation preview image data illustrated in FIG. 18, and FIG. 20 shows a table that illustrates management code data 507 on the after-designation preview image data illustrated in FIG. 18.

The display-mode determination unit 403 compares the management code data 506 on the before-designation preview image data with the management code data 507 on the after-designation preview image data and, as a result of the comparison, determines that the differences therebetween are setting of an editing and post-processing.

The display-mode determination unit 403 checks whether or not the editing and the post-processing are listed in the list of image processing registered in the registration unit 404. Because the editing and the post-processing are listed in this example, an instruction to enter the viewability-enhancing mode is issued to the display unit 115 so that only the areas on which the editing (punching) and the post-processing (a stamp of "COPY") have been performed are displayed with increased brightness in the after-designation preview image data.

As described above, when both the before-designation preview image and the after-designation preview image are arranged side-by-side for checking, the display unit 115 is controlled such that only an area where there is a change in setting of the image processing designated through the operation unit 114 illustrated in FIG. 4 is displayed with higher brightness than normal brightness. Thus, the viewability can be improved only for an area that a user wants to check when displaying a preview image; therefore, it is possible to prevent false recognition in image previewing and to reduce power consumption of the operation unit 114.

Second Embodiment

In the present embodiment, an explanation is given of a case where a document storage function is selected by using the function selection key 132 of the operation unit 114 illustrated in FIG. 4.

If the copy and document storage buttons are selected using the function selection key 132 of the operation unit 114 illustrated in FIG. 4 and the start button 143 is pressed, the read device 101 scans a document so as to send RBG image data to the memory 104. Then, the RGB image data is sent to the image processing unit 102 so as to be subjected to image processing according to various settings illustrated in FIG. 4 and to image processing in conformity with the write device 107.

For color copy, the image data is subjected to RGB to CMYK conversion and tone processing so as to conform to the electrophotographic process of the write device 107 that uses CMYK toners and is then sent to the memory 104 again.

If the setting for the addition of a binding margin has been specified by using the operation unit 114 illustrated in FIG. 4, the CMYK image data is sent to the editing processing unit 106 so as to be subjected to a shifting process and is then sent to the memory 104 again. If the setting for the addition of a stamp has been specified, the CPU 103 renders a stamp image in the CMYK image data stored in the memory 104. The CMYK image data stored in the memory 104 is then sent to and stored in the storage device 105.

As described above, a preview image is first generated by using RGB image data stored in the memory 104 and is then stored in the storage device 105. The CPU 103 manages, as a stored document, CMYK image data that is stored in the storage device 105 and used for copy output, RGB image data that is used for preview, various types of mode information that are designated by using the operation unit 114, and the registered title of the stored document that is separately designated.

Figure 21A:
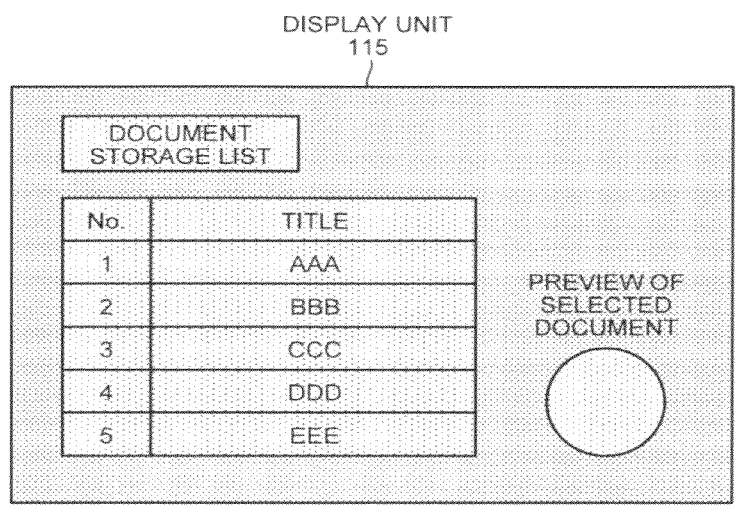
FIG. 21A is an explanatory diagram that illustrates a display example of a preview image according to a second embodiment.

If a user is to check a stored document, a list of stored documents is displayed on the display unit 115 as illustrated in FIG. 21A. If the user is to further check the details of a document, the user selects a document to be checked from the displayed document list and checks the previewed document. At that time, the display-mode determination unit 403 refers to the registration unit 404 to determine whether management code data on a stored document file is registered in the registration unit 404 so that the display unit 115 is controlled such that the brightness in displaying is switched.

Figure 21B:
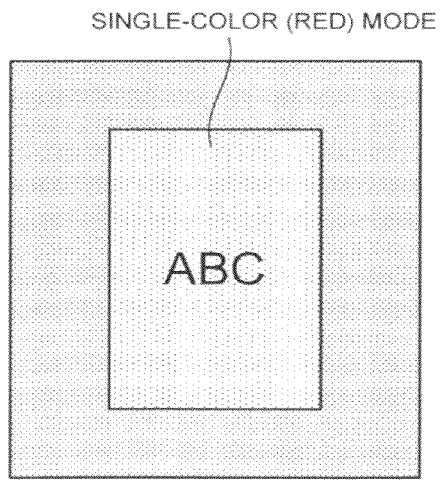
FIG. 21B is an explanatory diagram that illustrates a preview example of a stored document of single color.

As illustrated in FIG. 21B, if a stored document is a single-color document (including black-and-white document) such as for copy in red, a preview image is displayed with normal brightness in the power-saving mode.

Figure 21C:
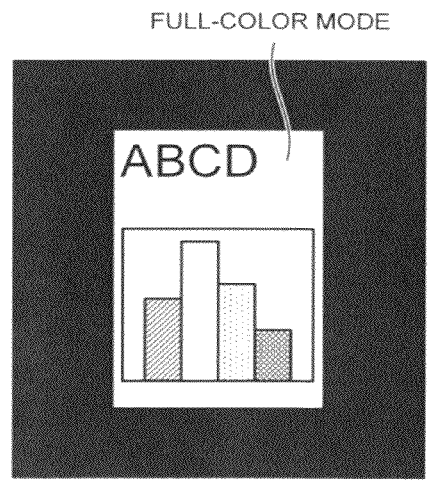
FIG. 21C is an explanatory diagram that illustrates a preview example of a stored document of full color.

As illustrated in FIG. 21C, if a stored document is a full-color document, a preview image is displayed with increased brightness in the viewability-enhancing mode.

Thus, according to the present embodiment, if a user is to check a document stored in the MFP in image previewing, the viewability is determined for display in accordance with the processing mode that is designated by the user when the document is stored; therefore, it is possible to reduce the display brightness so as to reduce the power consumption while preventing false recognition in image previewing. Thus, erroneous copies can be avoided, and therefore the running costs for a user can be significantly reduced.

Third Embodiment

In the present embodiment, an explanation is given of a case where a preview image is checked by enlarging/reducing or moving the preview image.

If the user wants to check a preview image in a more detailed manner, the user checks the preview image by enlarging/reducing or moving the preview image after the preview image is displayed on the display unit 115.

Figure 22:
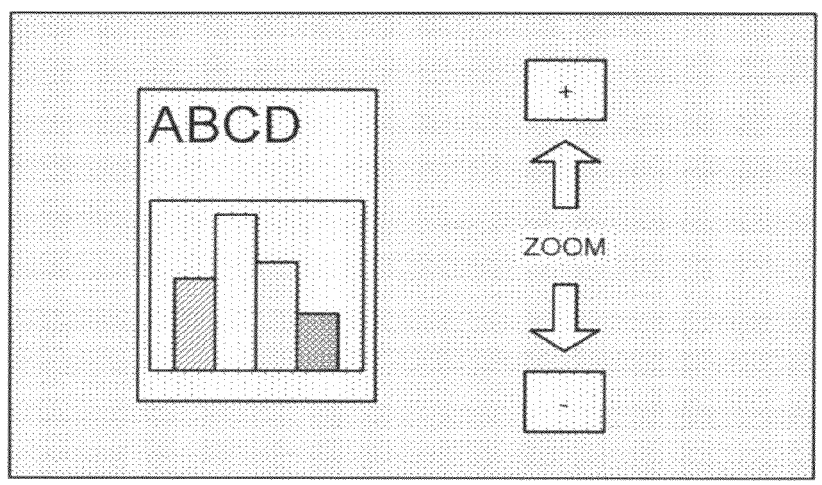
FIG. 22 is an explanatory diagram that illustrates a display example of a preview image according to a third embodiment.

FIG. 22 is an explanatory diagram that illustrates a display example according to the present embodiment. The display-mode determination unit 403 causes the preview image to be displayed with normal brightness (the power-saving mode) when first preview checking. If an operation (enlargement/reduction, or movement) is designated by the user in order to further check the preview image, the mode is switched to the viewability-enhancing mode so that the preview image is displayed with higher brightness than normal brightness.

Thus, according to the present embodiment, if checking of a preview image in a more detailed manner is designated when the preview image is to be checked by the user, the preview image is displayed with an improved viewability; therefore, it is possible to decrease the display brightness so as to reduce the power consumption while avoiding false recognition in image previewing.

Fourth Embodiment

An explanation is given of a case where optical character reader (OCR) processing is performed on image data of a read document according to a fourth embodiment.

If the copy and document storage buttons are selected using the function selection key 132 of the operation unit 114 illustrated in FIG. 4 and the start button 143 is pressed, the read device 101 scans a document so as to send RBG image data to the memory 104. Then, the CPU 103 performs the OCR processing on the RGB image data stored in the memory 104. A result of the OCR processing is stored, as accompanying information on a stored document, in the management code-data storage unit 402 of the storage device 105.

Figure 23A:
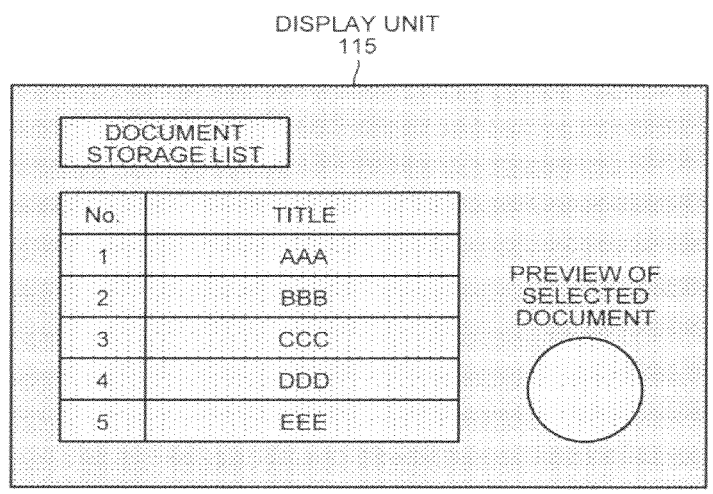
FIG. 23A is an explanatory diagram that illustrates a display example of a preview image according to a fourth embodiment.

When a user is to check a stored document, a list of stored documents is displayed on the display unit 115 in the same manner as the second embodiment. At that time, by using the operation unit 114 illustrated in FIG. 4, the user selects whether or not the OCR result is to be displayed all together (see FIG. 23A).

Figure 23B:
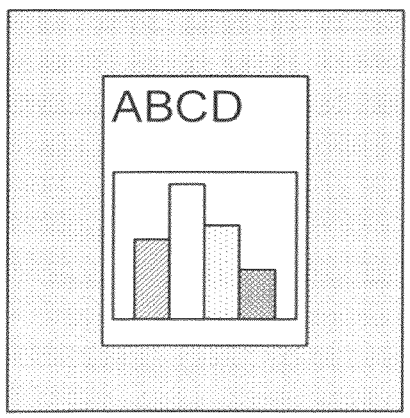
FIG. 23B is an explanatory diagram that illustrates a preview example of a stored document of single color mode.
Figure 23C:
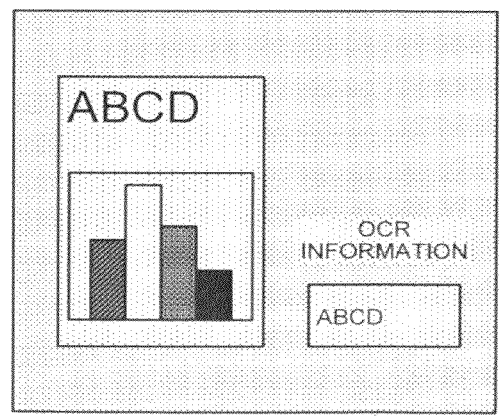
FIG. 23C is an explanatory diagram that illustrates a preview example of a stored document of full color.

If the OCR result is displayed together with a document image even when a stored document of full color is selected, the display-mode determination unit 403 determines that the power-saving mode is to be set and causes the preview image to be displayed with normal brightness (the power-saving mode) (see FIG. 23C). If the OCR result is displayed, the user can check not only image information but also character information at the same time; therefore, it is easy to recognize the details of a document. When a stored document of full color is displayed, a preview image is displayed in the viewability-enhancing mode in the same manner as the second embodiment (see FIG. 23B).

Thus, according to the present embodiment, if a user can determine the contents of a document stored in the MFP by using an OCR result when checking the stored document in image previewing, a preview image is displayed with normal brightness; therefore, it is possible to reduce the display brightness so as to reduce the power consumption and to significantly improve running costs for a user.

Fifth Embodiment

An explanation is given of a case where a confidential document is read according to a fifth embodiment. When a user selects the copy and document storage buttons by using the function selection key 132 of the operation unit 114 illustrated in FIG. 4, the user separately makes a setting to determine whether the document is a confidential document by using an undepicted button, or the like. Afterward, when the start button 143 is pressed, the read device 101 scans a document. Then, CMYK image data that is used for copy output, RGB image data that is used for preview, and various types of mode information are stored in and managed by the management code-data storage unit 402 of the storage device 105 described above, as well as information as to whether the document is a confidential document.

When a user is to check a stored document, the display-mode determination unit 403 causes a preview image to be displayed with normal brightness (the power-saving mode) if the selected document is a confidential document. Alternatively, the preview image may be displayed with lower brightness than normal brightness.

Thus, according to the present embodiment, when a document stored in the MFP is to be checked by a user in image previewing, if the stored document is a confidential document, the preview image is displayed with normal brightness without enhancing the viewability or recognition in image previewing. Thus, even if a person other than the user looks at the display unit 115, information leakage can be prevented and security can be significantly improved for a user.

The electric power of a display device that uses a liquid crystal is more consumed by a backlight source than is consumed by driving the liquid crystal. The backlight is controlled so that the ratio (the contrast ratio) between the maximum brightness and the minimum brightness of the liquid crystal display is changed. A reduction in the contrast ratio causes not only unclear black-and-white presentation but also a decrease in color purity of colored presentation, which results in a reduction in viewability and legibility for a user in image previewing operation.

Thus, according to the above-described embodiment, if a content of image processing that a user wants to check in image previewing operation is editing (binding margin, combination printing, or the like) or post-processing (stapling position, punching position, or the like), importance is not placed on fidelity to black-and-white sharpness or color shade on a preview screen. Even if the sharpness and color shade are decreased to some degree, a user can still visually check an image. Thus, even in the normal operating condition with low contrast, i.e., a state where the brightness of the backlight is reduced, viewability and legibility for a user are not decreased while the power consumption of the operation display unit can be reduced.

If a detail that a user wants to check in image previewing operation is image quality adjustment (density, sharpness, color shade, or the like), importance is placed on fidelity to black-and-white sharpness and color shade on a preview screen; therefore, high contrast, i.e., an increase in the brightness of the backlight is obtained. Thus, viewability for a user is improved.

A program to be executed according to the present embodiment is provided such that it is installed in, but not limited to, the memory 104 or the storage device 105 in advance. A program to be executed according to the present embodiment may be provided, as a computer program product, by being stored, in the form of a file that is installable and executable, in a recording medium readable by a computer, such as a CD-ROM, a flexible disk (FD), a CD-R, or a digital versatile disk (DVD).

Furthermore, a configuration may be such that a program to be executed according to the present embodiment is stored in a computer connected via a network such as the Internet and provided by being downloaded via the network. Moreover, a configuration may be such that a program to be executed according to the present embodiment is provided or distributed via a network such as the Internet.

A program to be executed according to the present embodiment has a modular configuration that includes the above-described units (the processing designating unit 10, the preview-image generating unit 11, the image processing unit 12, the editing processing unit 13, the preview-image display unit 15, the display-mode switching control unit 20, the management unit 21, the registration unit 22, and the determination unit 23). In actual hardware, the CPU 103 (processor) reads a program from the above-described recording medium and executes the read program so as to load the above-described units into a main storage, such as a RAM, so that each of the processing designating unit 10, the preview-image generating unit 11, the image processing unit 12, the editing processing unit 13, the preview-image display unit 15, the display-mode switching control unit 20, the management unit 21, the registration unit 22, and the determination unit 23 is generated in the main storage.

According to an aspect of the present invention, a display method of a preview image is switched in accordance with a processing detail that a user checks in image previewing operation; thus, advantages are produced such that the power consumption is reduced and running costs are lowered without decreasing viewability and legibility for the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image-processing designating unit that allows a user to designate predetermined image processing to be applied to image data for generating a preview image that represents a state of an output image before image output;
   a preview-image generating unit that generates a preview image in accordance with the designated image processing;
   a preview-image display unit that displays the preview image generated by the preview-image generating unit; and
   a display-mode switching control unit that, when the preview image is displayed, switches to a display mode with an enhanced viewability relative to a power-saving display state in accordance with a content of the designated image processing, wherein
   the display-mode switching control unit includes
      a management unit that manages information of the designated processing and a setting detail thereof;
      a registration unit that registers therein a list of image processing determined to be checked in the display mode with the enhanced viewability when a preview image subjected to the listed image processing is displayed; and
      a determination unit that determines whether or not the designated processing matches any of image processing listed in the list registered in the registration unit.

2. The image processing apparatus according to claim 1, wherein
   the management unit manages information of first and second designated image processing and setting details thereof, and
   the determination unit compares the setting detail of the first image processing and the setting detail of the second image processing so as to extract a difference therebetween, and determines whether the difference corresponds to a setting detail of the image processing that is listed in the list registered in the registration unit.

3. The image processing apparatus according to claim 1, wherein, if the designated image processing corresponds to image-quality adjustment processing, the display-mode switching control unit switches to the display mode with the enhanced viewability.

4. The image processing apparatus according to claim 1, wherein, if the designated image processing corresponds to color mode processing, the display-mode switching control unit switches to the display mode with the enhanced viewability.

5. The image processing apparatus according to claim 1, further comprising an instruction unit that gives an instruction for enlargement, reduction, or movement of a preview image after the preview image is displayed, wherein
the display-mode switching control unit switches to the display mode with the enhanced viewability when an instruction for the enlargement, reduction, or movement of the preview image is received.

6. An image processing apparatus comprising:
an image-processing designating unit that allows a user to designate predetermined image processing to be applied to image data for generating a preview image that represents a state of an output image before image output;
a preview-image generating unit that generates a preview image in accordance with the designated image processing;
a preview-image display unit that displays the preview image generated by the preview-image generating unit;
a display-mode switching control unit that, when the preview image is displayed, switches to a display mode with an enhanced viewability relative to a power-saving display state in accordance with a content of the designated image processing; and
an OCR processing unit that performs OCR processing on the output image, wherein
when a preview image and a processing result of the OCR processing are displayed side-by-side, the display-mode switching control unit displays the preview image and the processing result in a power-saving display mode.

7. An image processing apparatus comprising:
an image-processing designating unit that allows a user to designate predetermined image processing to be applied to image data for generating a preview image that represents a state of an output image before image output;
a preview-image generating unit that generates a preview image in accordance with the designated image processing;
a preview-image display unit that displays the preview image generated by the preview-image generating unit;
a display-mode switching control unit that, when the preview image is displayed, switches to a display mode with an enhanced viewability relative to a power-saving display state in accordance with a content of the designated image processing; and
a setting unit that makes a setting to determine whether the output image is a confidential document, wherein
if the output image is a confidential document, the display-mode switching control unit displays a preview image of the confidential document in a power-saving display mode.

8. An image processing apparatus comprising:
an image-processing designating unit that allows a user to designate first and second image processing, which differ in setting detail, to be applied to image data for generating preview images that represent different states of an output image before image output;
a preview-image generating unit that generates first and second preview images in accordance with the first and second image processing, respectively;
a preview-image display unit that displays, side-by-side, the first and second preview images having been subjected to the first and second image processing, respectively; and
a display-mode switching control unit that, when the first and second preview images are displayed side-by-side, switches a display mode with an enhanced viewability relative to a power-saving display state in accordance with a difference in setting detail between the first and second image processing, wherein
the display-mode switching control unit includes
a management unit that manages information of the designated processing and a setting detail thereof;
a registration unit that registers therein a list of image processing determined to be checked in the display mode with the enhanced viewability when a preview image subjected to the listed image processing is displayed; and
a determination unit that determines whether or not the designated processing matches any of image processing listed in the list registered in the registration unit.

9. The image processing apparatus according to claim 8, wherein
the management unit manages information of first and second designated image processing and setting details thereof, and
the determination unit compares the setting detail of the first image processing and the setting detail of the second image processing so as to extract a difference therebetween, and determines whether the difference corresponds to a setting detail of the image processing that is listed in the list registered in the registration unit.

10. The image processing apparatus according to claim 8, wherein, if the designated image processing corresponds to image-quality adjustment processing, the display-mode switching control unit switches to the display mode with the enhanced viewability.

11. The image processing apparatus according to claim 8, wherein, if the designated image processing corresponds to color mode processing, the display-mode switching control unit switches to the display mode with the enhanced viewability.

12. The image processing apparatus according to claim 8, wherein, when the difference in setting detail corresponds to a setting detail of any of editing processing and post-processing, the display-mode switching control unit switches to the display mode with the enhanced viewability for an image area, out of the second preview image, on which the any of the editing processing and the post-processing have been performed.

13. The image processing apparatus according to claim 8, further comprising an instruction unit that gives an instruction for enlargement, reduction, or movement of a preview image after the preview image is displayed, wherein
the display-mode switching control unit switches to the display mode with the enhanced viewability when an instruction for the enlargement, reduction, or movement of the preview image is received.

14. An image processing apparatus comprising:
an image-processing designating unit that allows a user to designate first and second image processing, which differ in setting detail, to be applied to image data for generating preview images that represent different states of an output image before image output;

a preview-image generating unit that generates first and second preview images in accordance with the first and second image processing, respectively;

a preview-image display unit that displays, side-by-side, the first and second preview images having been subjected to the first and second image processing, respectively;

a display-mode switching control unit that, when the first and second preview images are displayed side-by-side, switches a display mode with an enhanced viewability relative to a power-saving display state in accordance with a difference in setting detail between the first and second image processing; and an OCR processing unit that performs OCR processing on the output image, wherein
when a preview image and a processing result of the OCR processing are displayed side-by-side, the display-mode switching control unit displays the preview image and the processing result in a power-saving display mode.

15. An image processing apparatus comprising:

an image-processing designating unit that allows a user to designate first and second image processing, which differ in setting detail, to be applied to image data for generating preview images that represent different states of an output image before image output;

a preview-image generating unit that generates first and second preview images in accordance with the first and second image processing, respectively;

a preview-image display unit that displays, side-by-side, the first and second preview images having been subjected to the first and second image processing, respectively;

a display-mode switching control unit that, when the first and second preview images are displayed side-by-side, switches a display mode with an enhanced viewability relative to a power-saving display state in accordance with a difference in setting detail between the first and second image processing; and a setting unit that makes a setting to determine whether the output image is a confidential document, wherein
if the output image is a confidential document, the display-mode switching control unit displays a preview image of the confidential document in a power-saving display mode.

16. An image processing method comprising:

allowing a user to designate predetermined image processing to be applied to image data for generating a preview image that represents a state of an output image before image output;

generating a preview image in accordance with the designated image processing;

displaying the preview image generated at the generating; and switching, when the preview image is displayed, to a display mode with an enhanced viewability relative to a power-saving display state in accordance with a content of the designated image process, wherein the displaying includes
managing information of the designated processing and a setting detail thereof;
registering a list of image processing determined to be checked in the display mode with the enhanced viewability when a preview image subjected to the listed image processing is displayed; and
determining whether or not the designated processing matches any of image processing listed in the registered list.

* * * * *